United States Patent [19]

Costin et al.

[11] Patent Number: 5,175,248
[45] Date of Patent: Dec. 29, 1992

[54] PROCESS FOR THE REMOVAL OF N-VINYLCARBAZOLE FROM POLY(N-VINYLCARBAZOLE)

[75] Inventors: C. Richard Costin, West Chester; Thomas W. Hazell, Swarthmore; Gary W. Ceska; James P. Horgan, both of West Chester, all of Pa.

[73] Assignee: Sartomer Company, Inc., Exton, Pa.

[21] Appl. No.: 533,022

[22] Filed: Jun. 4, 1990

[51] Int. Cl.⁵ ................................................ C08F 6/10
[52] U.S. Cl. ..................................... 528/487; 528/495; 528/497
[58] Field of Search ...................... 528/487, 497, 495

[56] References Cited

U.S. PATENT DOCUMENTS 3,999,989  12/1976  Ono et al. ................................ 430/80
4,360,644  11/1982  Naarmann et al. ...................... 528/487

FOREIGN PATENT DOCUMENTS 0318822  11/1988  European Pat. Off. .
318222  6/1989  European Pat. Off. .

Primary Examiner—Joseph L. Schofer
Assistant Examiner—Tom Weber
Attorney, Agent, or Firm—James Albert Drobile

[57] ABSTRACT

The residual level of N-vinylcarbazole in polyvinylcarbazole has been reduced to an amount less than 25 ppm by treatment of a solution of the polyvinylcarbazole with a strong acid. The polymer can be recovered in pure form by precipitation of the polymer from solution with a non-solvent.

15 Claims, No Drawings

PROCESS FOR THE REMOVAL OF N-VINYLCARBAZOLE FROM POLY(N-VINYLCARBAZOLE)

BACKGROUND OF THE INVENTION

The present invention is directed to a purification process for the removal of N-vinylcarbazole from polyvinylcarbazole. Polyvinylcarbazole has uses as an electrical insulating material, a dielectric in capacitors, and a photoconductive film in the xerographic reproduction process. Polyvinylcarbazole is typically prepared by the free radical polymerization of N-vinylcarbazole. Commercial grade polyvinylcarbazole contains up to six percent residual N-vinylcarbazole. N-vinylcarbazole is a mutagen and suspected carcinogen. Clay has been used to decrease the level of N-vinylcarbazole in the polyvinylcarbazole to below 25 ppm. The use of clay is disadvantageous due to the presence of large amounts of fine particulate matter. The fine particulate matter creates significant backpressure in purification columns and is difficult to remove from the final product.

SUMMARY OF THE INVENTION

We have now found that by dissolving polyvinylcarbazole in a suitable solvent and treating with certain acids or cationic resins, preferably sulfonic acids and sulfonated resins, the residual N-vinylcarbazole is reduced to below 25 ppm without the disadvantages of earlier methods. By recovery of the polymer by precipitation, filtration and drying, the polymer is obtained in pure form.

DETAILED DESCRIPTION OF THE INVENTION

Certain acids and cationic resins were found to react with N-vinylcarbazole to form carbazole, thereby removing the N-vinylcarbazole from the system. These acids can be used to remove N-vinylcarbazole from polyvinylcarbazole. Commercial grade polyvinylcarbazole, which typically contains from two to six percent N-vinylcarbazole, is dissolved in a suitable solvent at an elevated temperature. The preferred solvent is toluene. The preferred temperature range is 80°-90° C. An elevated temperature is not required to convert N-vinylcarbazole to carbazole, however by increasing the temperature the solubility of the polyvinylcarbazole is improved.

When treatment with acid is used, the acid is dissolved in a small amount of isopropanol then added slowly to the polyvinylcarbazole solution. The preferred acids are sulfonic acids. The preferred sulfonic acids are methane sulfonic acid and p-toluene sulfonic acid. The polyvinylcarbazole solution is agitated at an elevated temperature for several hours. The preferred temperature range is 50°-90° C.

When treatment with cationic resin is used, the resin is slurried with the solvent of choice used for dissolving the polyvinylcarbazole and placed in a column. The preferred resins are strongly acidic sulfonated resins. The preferred sulfonated resin is Amberlyst 15 Cationic Exchange Resin, made by Rohm & Haas Co. The polyvinylcarbazole solution is passed through the column at an elevated temperature. The preferred temperature range is 80°-90° C.

After the polyvinylcarbazole solution has been treated with the acid, the polyvinylcarbazole may be separated by any of the known methods such as freeze-drying, or precipitation by a non-solvent, preferably methanol. The precipitated polyvinylcarbazole is filtered, washed with methanol, filtered, then dried under vacuum at a maximum temperature of 60° C.

The following examples are meant to further illustrate, but not to limit the invention.

EXAMPLE I

In a 250 ml round bottom flask, 7.9 g of commercial grade polyvinylcarbazole (Luvican M-170, by BASF) was dissolved in 92.1 g of toluene by agitating for four hours at 90° C. The polyvinylcarbazole solution was cooled to 50° C. and maintained at that temperature during the remainder of the : process. Next, 0.2 g of p-toluene sulfonic acid was dissolved in 2 g of isopropanol, then added dropwise to the polyvinylcarbazole solution. The solution was agitated for two hours. The polyvinylcarbazole solution was added to a commercial blender containing 1 liter of methanol and agitated at high speed for 1 minute. The precipitated polyvinylcarbazole was vacuum filtered, then placed in a flask with 200 ml of methanol and agitated for 10 minutes. The polyvinylcarbazole was then vacuum filtered and dried under vacuum at 60° C. for four hours. A white powder was obtained.

Analysis by gas chromatography showed the untreated polymer to contain 2.2% N-vinlycarbazole and 0.09% carbazole. The treated polymer contained less than 25 ppm N-vinylcarbazole and 0.026% carbazole.

EXAMPLE II

In a 2 liter round bottom flask, 79 g of commercial grade polyvinylcarbazole (Luvican M-170, BASF) was dissolved in 921 g of toluene by agitating for 6 hours at 90° C. A slurry of 60.8 g of Amberlyst 15 Cationic Exchange Resin and 200 ml of toluene was transferred into a jacketed glass column (ID 3.12 cm, bed length 13 cm, bed volume 100 ml). A jacketed 500 ml addition funnel was mounted on the top of the column. The column and addition funnel were maintained at 80°-90° C. throughout the process. The excess toluene was drained from the column. The polyvinylcarbazole solution was transferred to the addition funnel and passed through the column at a rate of one bed volume per 10 minutes. The polyvinylcarbazole solution was collected and precipitated by adding 500 ml of polyvinylcarbazole solution to a commercial blender containing 3 liters of methanol and agitating at high speed for one minute. The precipitate was vacuum filtered then placed in a flask with one liter of methanol and agitated for 10 minutes. The polyvinylcarbazole was then vacuum filtered and dried under vacuum at 60° C. for four hours. A white powder was obtained.

Analysis by gas chromatography showed the untreated polymer to contain 2.2% N-vinylcarbazole and 0.09% carbazole. The treated polymer before precipitation contained 1.4% carbazole and no detectable N-vinylcarbazole (<25 ppm). The treated polymer after precipitation contained 0.08% carbazole and no detectable N-vinylcarbazole (<25 ppm).

We claim:

1. A process for removing N-vinylcarbazole from poly-(N-vinylcarbazole), comprising the steps of dissolving poly-(N-vinylcarbazole) in a suitable first solvent, treating the poly-(N-vinyl-carbazole)-containing first solvent with an effective amount of a strongly acidic compound sufficient to reduce the content of N-vinylcarbazole in said poly-(N-vinylcarbazole), and recovering purified poly-(N-vinylcarbazole).

2. The process of claim 1, wherein the step of recovering purified poly-(N-vinylcarbazole), further comprises the steps of precipitating said poly-(n-vinylcarbazole) from said poly-(N-vinylcarbazole)-containing first solvent by adding a nonsolvent therefor, filtering the precipitated poly-(N-vinylcarbazole), and drying said precipitated poly-(N-vinylcarbazole).

3. The process of claim 2, wherein said suitable first solvent is toluene, said strongly acidic compound is selected from the group consisting of methane sulfonic acid, p-toluenesulfonic acid, and a sulfonated exchange resin, and said non-solvent is methanol.

4. The process of claim 1, wherein said first solvent is toluene.

5. The process of claim 1, wherein said strongly acidic compound is a sulfonic acid.

6. The process of claim 5, wherein said sulfonic acid is selected from the group consisting of methane sulfonic acid, p-toluene sulfonic acid and a sulfonated cationic exchange resin.

7. The process of claim 1, wherein said strongly acidic compound is methane sulfonic acid.

8. The process of claim 1, wherein said strongly acidic compound is p-toluene sulfonic acid.

9. The process of claim 1, wherein said strongly acidic compound is a sulfonated cationic exchange resin.

10. The process of claim 1, wherein the step of treating said poly-(N-vinylcarbazole)-containing first solvent, further comprises the steps of slurrying said strongly acidic compound with a suitable second solvent, passing said poly-(n-vinylcarbazole)-containing first solvent through said slurry and collecting said poly-(n-vinylcarbazole)-containing first solvent.

11. The process of claim 1, wherein the step of treating said poly-(N-vinylcarbazole)-containing first solvent, further comprises the steps of adding said strongly acidic compound to a suitable second solvent and adding said strongly acidic compound-containing second solvent to said poly-(N-vinylcarbazole)-containing first solvent.

12. The process of claims 1, 10 or 11, further comprising the step of heating said poly-(N-vinylcarbazole)-containing first solvent at 80 to 90 degrees Centigrade.

13. The process of claims 1, 10 or 11, further comprising the step of heating said poly-(N-vinylcarbazole)-containing first solvent at 50 to 90 degrees Centigrade.

14. The process of claim 2, wherein said nonsolvent is methanol.

15. The process of claim 2, wherein said drying step is a vacuum drying step conducted at a temperature less than 60 degrees Centigrade.

* * * * *